United States Patent
Umezawa et al.

(10) Patent No.: US 8,142,693 B2
(45) Date of Patent: Mar. 27, 2012

(54) STAMPER AND STAMPER EVALUATION METHOD

(75) Inventors: Kazuyo Umezawa, Yokohama (JP); Seiji Morita, Yokohama (JP); Masatoshi Sakurai, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 224 days.

(21) Appl. No.: 12/569,771

(22) Filed: Sep. 29, 2009

(65) Prior Publication Data

US 2010/0188964 A1 Jul. 29, 2010

(30) Foreign Application Priority Data

Jan. 23, 2009 (JP) .................. 2009-013470

(51) Int. Cl.
B29C 45/76 (2006.01)
(52) U.S. Cl. ...... 264/40.1; 428/64.1; 264/293; 356/445; 356/448; 356/237.5; 360/31; 369/53.1
(58) Field of Classification Search .......... 428/64.1, 428/64.2; 369/53.1; 360/31; 324/212; 356/445, 356/448, 237.5; 264/40.1, 293
See application file for complete search history.

(56) References Cited

U.S. PATENT DOCUMENTS

| 6,748,865 B2 | 6/2004 | Sakurai et al. | |
| 2010/0143517 A1* | 6/2010 | Umezawa et al. | 425/112 |
| 2010/0148095 A1* | 6/2010 | Umezawa et al. | 250/552 |
| 2010/0188952 A1* | 7/2010 | Umezawa et al. | 369/53.22 |

FOREIGN PATENT DOCUMENTS

| JP | 56-090246 | 7/1981 |
| JP | 62-50774 | 10/1987 |
| JP | 01-147348 A | 6/1989 |
| JP | H05-182257 | 7/1993 |
| JP | 2003-157520 A | 5/2003 |
| JP | 2004-362673 A | 12/2004 |
| JP | 2008-251130 A | 10/2008 |

OTHER PUBLICATIONS

Notice of Reasons for Rejection mailed by Japan Patent Office on Dec. 8, 2009 in the corresponding Japanese patent application No. 2009-013470.
Final Notice of Rejection mailed by Japan Patent Office on Jul. 20, 2010 in the corresponding Japanese patent application No. 2009-013470.
Explanation of Non-English Language References.
Machine Translation of Japanese Publication No. JP 05-182557.
Machine Translation of Japanese Publication No. JP 2003-157520, (which is the Publication for Japanese Application No. 2001-358062).
Machine Translation of Japanese Publication No. JP 2004-362673.
Japanese Office Action for Japanese Application No. 2010-131838, dated Sep. 5, 2011, mailed Sep. 13, 2011, in 7 pages.

* cited by examiner

*Primary Examiner* — Mark Ruthkosky
*Assistant Examiner* — Gerard Higgins
(74) *Attorney, Agent, or Firm* — Knobbe, Martens, Olson & Bear LLP

(57) ABSTRACT

According to one embodiment, letting Vf be a maximum voltage value level within the range of a frequency 60 to 170 times the rotational speed of a stamper and Vave be the average sum signal voltage value of a data recording portion in the sum signal of a voltage signal when the data recording portion is irradiated with a laser having a wavelength of 450 nm or less and an NA of 0.6 or more, whether Vf and Vave meet $Vf/Vave < 7.7 \times 10^{-4}$ ... (1) is determined.

3 Claims, 5 Drawing Sheets

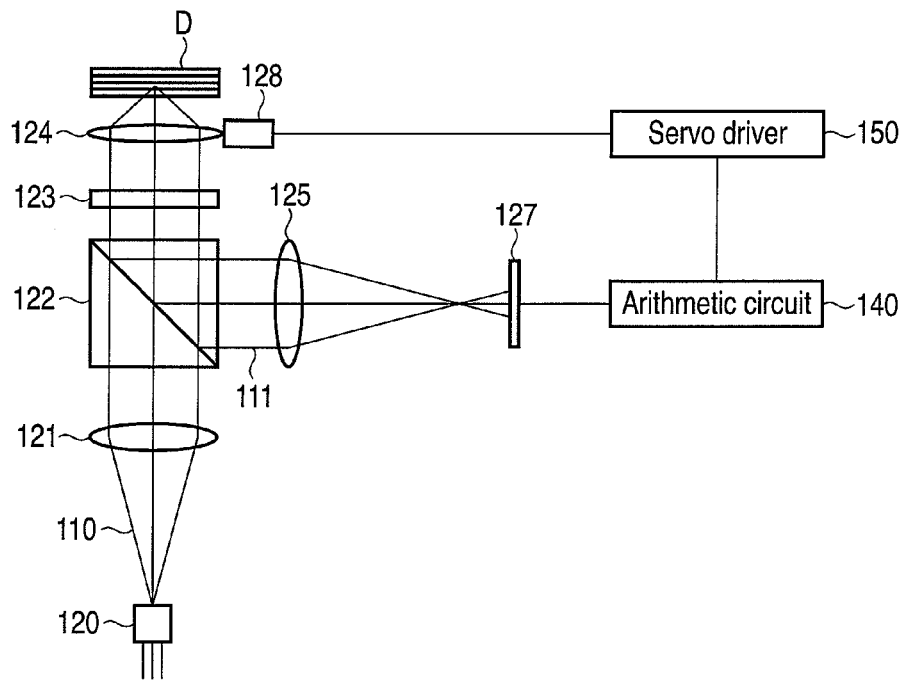
F I G. 1
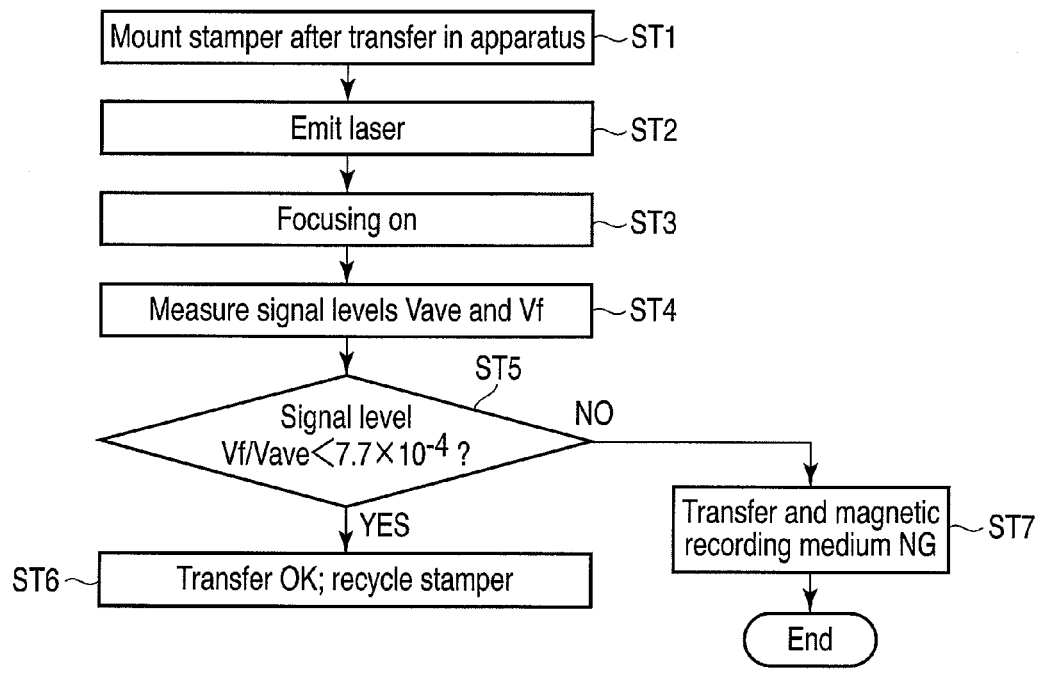
F I G. 2

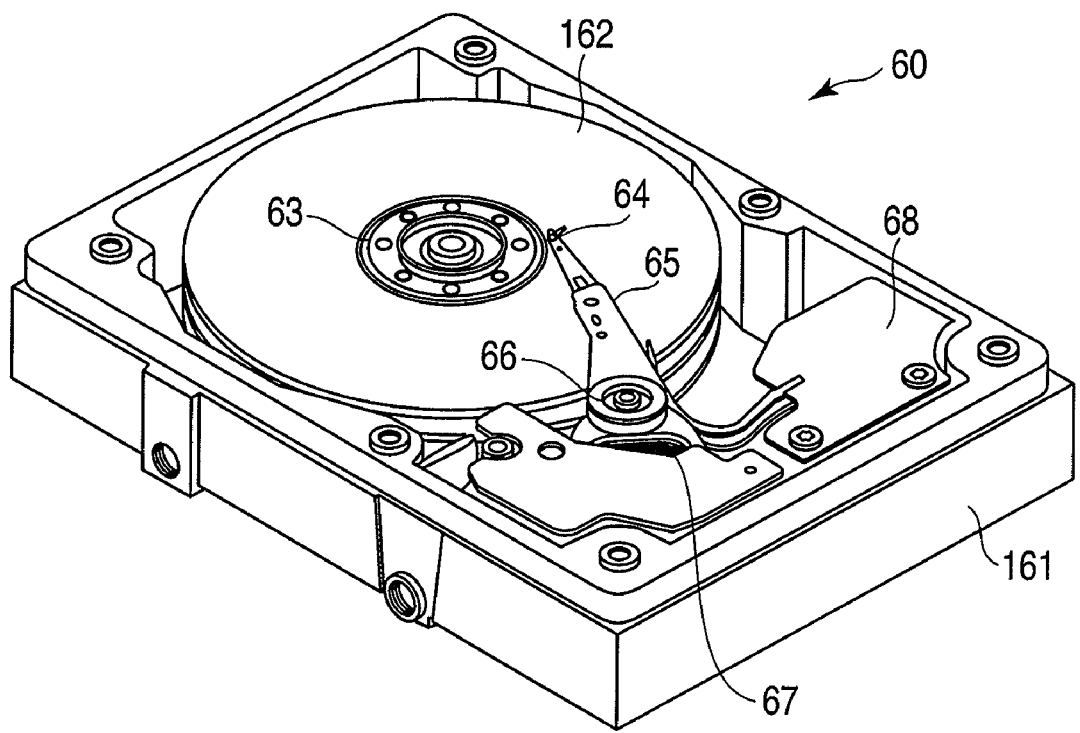
F I G. 6

STAMPER AND STAMPER EVALUATION METHOD

CROSS-REFERENCE TO RELATED APPLICATIONS

This application is based upon and claims the benefit of priority from Japanese Patent Application No. 2009-013470, filed Jan. 23, 2009, the entire contents of which are incorporated herein by reference.

BACKGROUND

1. Field

One embodiment of the present invention relates to a stamper to be used in the manufacture of a magnetic recording medium having discrete tracks on the surface of a magnetic recording layer and, more particularly, to a light-transmitting stamper for transferring three-dimensional patterns corresponding to discrete tracks onto a resist.

2. Description of the Related Art

Recently, a discrete track recording medium (DTR medium) having physically separated recording tracks has been proposed in order to increase the recording density of a magnetic recording medium.

In the process of manufacturing this DTR medium, as disclosed in, e.g., Jpn. Pat. Appln. KOKAI Publication No. 2003-157520, an imprinting stamper is pressed against a resist applied on the surface of a magnetic recording layer to transfer three-dimensional patterns onto the resist, and the magnetic recording layer is processed by using the resist as a mask.

Conventionally, an Ni stamper, father stamper, mother stamper, or son stamper formed by an electroforming process has been used as the imprinting stamper as described above. However, a long formation time of about 1 hr is required for one Ni stamper when the electroforming process is used, and the Ni stamper is unsuited to mass-production because the life of the Ni stamper is short. By contrast, when an initial Ni stamper is formed as a father stamper by the electroforming process and a mother stamper or son stamper is formed by using an injection molding process after that, one resin stamper is obtained for a short formation time of about a few sec.

The injection molding process as described above has been used in the manufacture of an optical disc.

For example, in an optical disc such as a DVD (Digital Versatile Disc) obtained by bonding two molded substrates, three-dimensional patterns having a track pitch of 300 nm or more are formed on at least one molded substrate, and an optical recording layer including the three-dimensional structure and having a thickness of 30 μm or more is formed.

In the DTR medium, however, patterns having a track pitch of 100 nm or less and a three-dimensional pattern height of 100 nm or less are formed. When the density of data is increased and the tracks are thus micropatterned, the life of the resin stamper readily shortens owing to the transfer and peeling of the resist patterns.

Also, when using a general defect testing apparatus, defects are normally detected by using the reflection of light. Unfortunately, a light-transmitting stamper such as the resin stamper has a low reflectance because the stamper transmits light. In addition, a defect test on the pattern upper surface is difficult to conduct because light from not only the pattern upper surface but also the pattern lower surface is reflected.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing an outline of the arrangement of a stamper testing apparatus;

FIG. 2 is a flowchart showing a stamper testing method;

FIG. 6 is a view showing an example of a magnetic recording apparatus.

DETAILED DESCRIPTION

Figure 3:
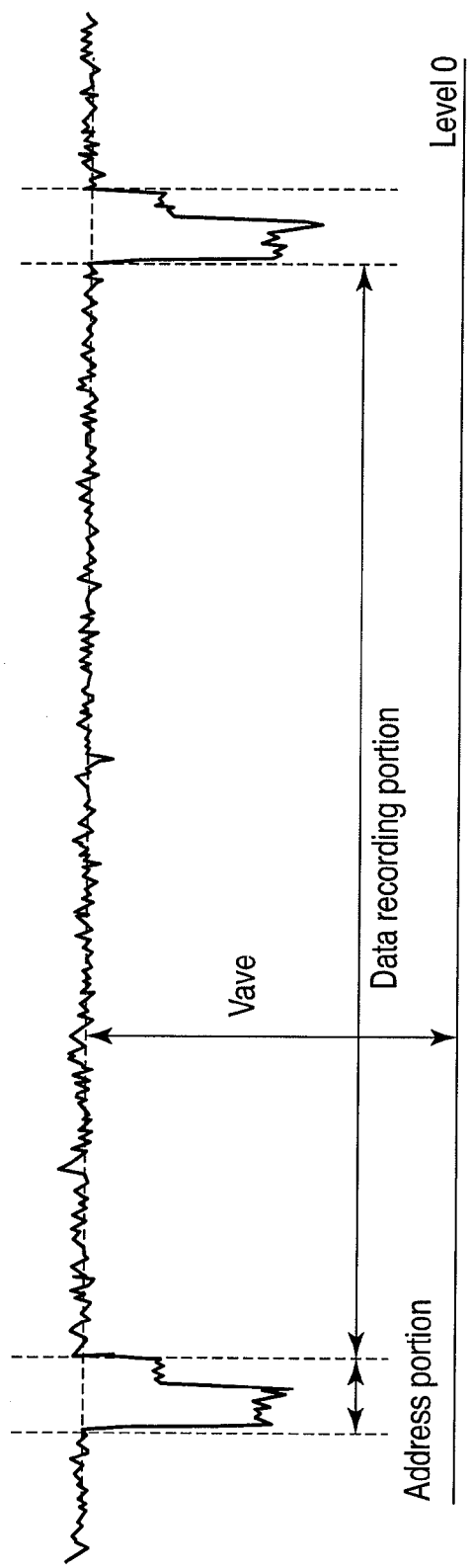
FIG. 3 is a view showing an example of the waveform of Vave.

Various embodiments according to the invention will be described hereinafter with reference to the accompanying drawings. In general, according to one embodiment of the invention, a stamper to be used in the present invention is used to transfer a pattern corresponding to a track pattern and/or an address pattern onto an ultraviolet-curing resin layer formed as a mask in order to form the track pattern and/or the address pattern on a recording layer surface of a recording medium, and has a three-dimensional pattern having an area corresponding to a data area including a data recording portion and address portion of the recording medium.

In addition, letting Vf be a maximum voltage value level within the range of a frequency 60 to 170 times the rotational speed of the stamper and Vave be the average sum signal voltage value of the data recording portion in the sum signal of a voltage signal obtained based on reflected light when the data recording portion is irradiated with a laser having a wavelength of 450 nm or less and a laser numerical aperture NA of 0.6 or more while the stamper is rotated, the stamper of the present invention meets $$Vf/Vave < 7.7 \times 10^{-4} \tag{1}$$

The resin stamper as described has no defect, and can be used to transfer a three-dimensional pattern onto an ultraviolet-curing resin layer.

Also, letting Vf be a maximum voltage value level within the range of a frequency 60 to 170 times a rotational speed of a stamper and Vave be the average sum signal voltage value of a data recording portion in the sum signal of a voltage signal obtained based on reflected light when the data recording portion is irradiated with a laser having a wavelength of 450 nm or less and a laser numerical aperture NA of 0.6 or more while the stamper is rotated, a stamper evaluation method of the present invention determines whether equation (1) below is met.

$$Vf/Vave < 7.7 \times 10^{-4} \tag{1}$$

The stamper evaluation method according to the present invention can readily determine the presence/absence of a defect of a stamper. The method also makes it possible to use a defect-free stamper in the transfer of a pattern corresponding to a track pattern.

Furthermore, the value of Vf/Vave can be obtained by measuring each sum signal of the voltage signal before and after a pattern is transferred onto an ultraviolet-curing resin. If this value meets equation (1) and there is no large change between the values before and after the pattern transfer, it is possible to determine that the stamper has no defect and can be recycled.

Additionally, if the relationship between Vf and Vave before the pattern corresponding to the track pattern is transferred satisfy equation (1) and the relationship is the same after the pattern corresponding to the track pattern is transferred, the stamper can be recycled.

A testing apparatus for a stamper after ultraviolet-curing resin transfer will be explained below.

The apparatus will be explained by taking a 0.6-mm thick molded resin stamper for a 1.8-in magnetic recording medium as an example.

This resin stamper has a data area within the range of a radius of 9.0 to 23.0 mm from the center. The data area has a data recording portion and address portion. In the data recording portion, the track pitch was 0.1 μm (L/G=70 nm/30 nm), and the depth was 50 nm.

FIG. 1 is a block diagram showing an outline of the arrangement of a testing apparatus for checking the presence/absence of a transfer defect of an ultraviolet-curing resin by playing back the data area of the stamper.

As shown in FIG. 1, the stamper is made of, e.g., a resin. A semiconductor laser source 120 is used as a light source. The wavelength of the exit light is in, e.g., the violet wavelength band within the range of 400 to 410 nm. A numerical aperture NA of the laser can be 0.6 or more. Exit light 110 from the semiconductor laser source 120 is collimated into parallel light by a collimator lens 121, and this parallel light enters an objective lens 124 through a polarizing beam splitter 122 and λ/4 plate 123. After that, the light is transmitted through a substrate of stamper D, and focused on a substrate surface in which grooves are formed. Reflected light 111 from an information recording layer of stamper D is transmitted through the substrate of stamper D again, transmitted through the objective lens 124 and λ/4 plate 123, and reflected by the polarizing beam splitter 122. After that, the reflected light 111 enters a photodetector 127 through a condenser lens 125.

A light-receiving unit of the photodetector 127 is normally divided into a plurality of portions, and each light-receiving portion outputs an electric current corresponding to the light intensity. The output electric current is converted into a voltage by an I/V amplifier (current-voltage converter) (not shown), and the voltage is input to an arithmetic circuit 140. The arithmetic circuit 140 performs an arithmetic operation on the input voltage signal, thereby generating a tilt error signal, HF signal, focusing error signal, and tracking error signal. The tilt error signal is used to perform tilt control. The HF signal is used to reproduce recorded information. The focusing error signal is used to perform focusing control. The tracking error signal is used to perform tracking control.

The objective lens 124 can be driven in the vertical direction, disc radial direction, and tilt direction (radial direction or/and tangential direction) by an actuator 128, and is controlled to follow information tracks on stamper D by a servo driver 150.

Note that in this testing apparatus, the wavelength of the semiconductor laser is in the range of 400 to 410 nm as an example. However, the present invention is not limited to this, and the wavelength can also be shorter.

Note also that the NA is 0.6 or more in this testing apparatus. However, as the NA increases, the spot diameter of the laser decreases, and this makes it possible to find smaller defects.

The stamper of the present invention can be played back by using the stamper testing apparatus as described above. In this embodiment, PULSTEC DDU-1000 was used. The laser wavelength was 405 nm, and the NA (Numerical Aperture) was 0.65. The laser spot diameter is about 0.6 nm, i.e., about six times the track pitch in the data recording portion. When this pattern is reproduced, therefore, the three-dimensional structure of the pattern in the data recording portion cannot be observed from the reflected light of the laser, and detected as constant reflected light. Similarly, no detailed pattern can be detected in the address portion by the reflected light. This is the advantage that the overall tendency can easily be checked regardless of each signal intensity.

A method of testing the stamper after ultraviolet-curing resin transfer will be explained below.

FIG. 2 is a flowchart showing the stamper testing method of the present invention.

The stamper was set in the evaluation apparatus described above, and rotated at a linear velocity of 1.2 m/s in this embodiment (ST1).

The laser is emitted (ST2), and focusing is performed by adjusting tilt and offset to maximize a difference signal (push-pull signal) (ST3). A sum signal is extracted as an output signal from the evaluation apparatus, and the waveform is obtained by a digital oscilloscope. An average voltage value Vave in the data recording portion for one rotation and a maximum voltage value Vf within the range of a frequency 60 to 170 times the rotational speed of the stamper are measured (ST4). Vf/Vave is calculated (ST5).

FIG. 3 shows an example of the waveform of Vave. This waveform is a partial waveform of one rotation, and has both the address portion and data recording portion. The signal level of the data recording portion alone is checked, and the average voltage value Vave is checked for one rotation and used in the calculation as shown in FIG. 3.

Then, the output sum signal was observed with an FFT analyzer (the CF-5210 manufactured by ONO SOKKI was used). Note that the measurement condition of the FFT analyzer is the average data of 100 samples.

At a linear velocity of 1.2 m/s, the frequencies of one rotation, 60 rotations, and 170 rotations are respectively 8.5, 510, and 1,445 Hz for r=22.5 mm. A value at which the voltage value is maximum between 510 and 1,445 Hz is extracted as Vf.

The quality of the transfer state is determined by normalizing Vf thus obtained by Vave obtained previously.

Note that the measurement can be performed in only one radial position, and can also be performed in several positions or over the entire stamper surface. The best method is to check the entire stamper surface. If transfer is insufficient, however, defects occur on the entire surface owing to the residual ultraviolet-curing resin. Therefore, it is particularly favorable to perform measurement near the outer periphery because the measurement time shortens.

If Vf/Vave is smaller than $7.7 \times 10^{-4}$, transfer is OK, and the used resin stamper can also be recycled if necessary (ST6). If this value is larger than $7.7 \times 10^{-4}$, transfer is NG, and the magnetic recording medium is also an NG product owing to defective transfer (ST7).

Embodiments of the present invention will be explained below with reference to the accompanying drawing.

First, a medium manufacturing method common to the embodiments and comparative examples will be explained below.

A transparent resin stamper was formed by the following method.

First, a master was coated with a resist, and a servo area and data area were written by electron beam lithography, thereby forming a resist master. A positive resist was used as the resist, and the thickness of the resist was set to 50 nm. Three-dimensional patterns corresponding to discrete tracks in the data area had a track pitch (TP) of 100 nm.

An Ni stamper for injection molding was formed by electroforming this resist master. Note that as the Ni stamper, it is possible to use any of a so-called father stamper initially manufactured from the master; a mother stamper duplicated from the father stamper by electroforming; and a son stamper duplicated from the mother stamper by electroforming.

Transparent resin stampers A to D were formed by injection molding by using one Ni stamper. Polycarbonate (PC) can be used as the material of the transparent stampers. When the releasability to an ultraviolet-curing resin is taken into consideration, however, it is possible to use, e.g., a cycloolefin polymer (COP), a cycloolefin copolymer (COC), or polymethylmethacrylate (PMMA). It is also possible to mix an organic compound containing a fluorine substituent or silicon as a releasing agent in each material.

In the present invention, a cycloolefin copolymer was used as the material of the transparent stampers.

FIGS. 4A to 4G are views for explaining a method of forming a magnetic recording medium by using the stamper of the present invention.

Figure 4A:
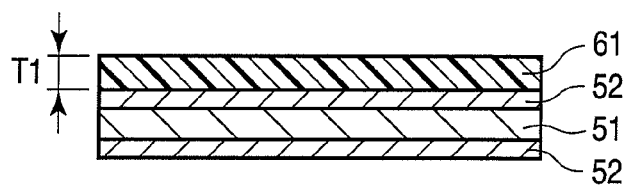
FIGS. 4A to 4G are views for explaining a method of forming a magnetic recording medium by using the stamper of the present invention.

As shown in FIG. 4A, magnetic layers 52 were formed on the two surfaces of a doughnut-like glass substrate 51 as a medium substrate.

As the magnetic layer, it is possible to use a so-called perpendicular double-layered medium having a perpendicular magnetic recording layer on a soft magnetic (backing) layer.

As the soft magnetic (backing) layer, materials containing, e.g., Fe, Ni, and Co can be used. Examples of the materials are FeCo-based alloys such as FeCo and FeCoV, FeNi-based alloys such as FeNi, FeNiMo, FeNiCr, and FeNiSi, FeAl-based alloys and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN.

The perpendicular magnetic recording layer can contain Co as a main component and can also contain Pt. It is also possible to use a material further containing an arbitrary oxide. As this oxide, it is possible to particularly select silicon oxide or titanium oxide.

Magnetic grains (magnetic crystal grains) can be dispersed in the perpendicular magnetic recording layer. The magnetic grain can have a columnar structure vertically extending through the perpendicular magnetic recording layer. This structure can improve the orientation and crystallinity of the magnetic grains in the perpendicular magnetic recording layer. Consequently, a signal/noise ratio (S/N ratio) suited to high-density recording can be obtained. To obtain this structure, the amount of oxide to be contained is important. The content of the oxide can be 3 (inclusive) to 12 (inclusive) mol %, and can also be 5 (inclusive) to 10 (inclusive) mol % of the total amount of Co, Cr, and Pt. When the content of the oxide in the perpendicular magnetic recording layer falls within the above range, the oxide deposits around the magnetic grains when the layer is formed. This makes it possible to isolate and downsize the magnetic grains.

The thickness of the perpendicular magnetic recording layer can be 5 to 60 nm, and can also be 10 to 40 nm. When the thickness of the perpendicular magnetic recording layer is in this range, the medium can operate as a magnetic recording/reproduction apparatus more suitable for high-density recording. If the thickness of the perpendicular magnetic recording layer is less than 5 nm, the reproduction output is too low, and the noise component often becomes higher than the reproduction output. If the thickness of the perpendicular magnetic recording layer exceeds 40 nm, the reproduction output becomes too high and often distorts the waveform.

The magnetic layer 52 on one surface of the glass substrate 51 was spin-coated, so as not to cover the central hole, with an ultraviolet-curing resin having a viscosity of 5 cps (to be referred to as an ultraviolet-curing resin hereinafter), and the ultraviolet-curing resin was spread at a rotational speed of 10,000 for 30 sec, thereby forming an ultraviolet-curing resin layer 61 having a thickness T1 of 60 nm.

Figure 4B:
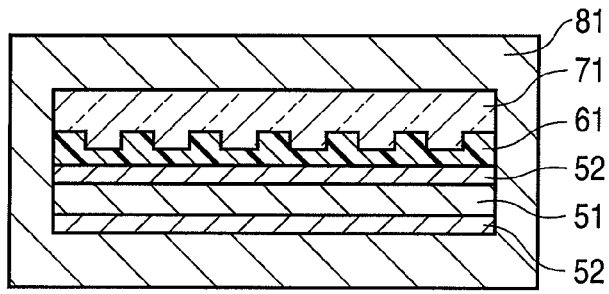

As shown in FIG. 4B, a first transparent resin stamper 71 having three-dimensional patterns was prepared.

In a vacuum chamber 81, one surface of the glass substrate 51 and the pattern surface of the first transparent stamper 71 were bonded via the ultraviolet-curing resin layer 61 in a vacuum ambient at $10^3$ Pa or less.

Figure 4C:
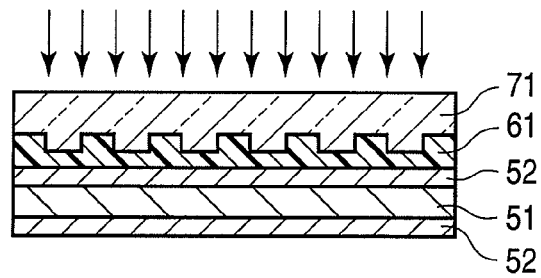

As shown in FIG. 4C, the vacuum was released, and the ultraviolet-curing resin layer 61 was cured by UV radiation through the first transparent stamper 71 at an atmospheric pressure. Although the time required for curing depends on the curing characteristic of a polymerization initiator contained in the ultraviolet-curing resin used and the ability of a UV light source, the resin is normally curable for a few ten sec.

Figure 4D:
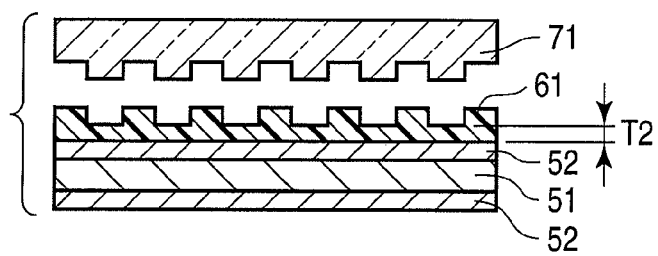

As shown in FIG. 4D, the first transparent stamper 71 was peeled from the glass substrate 51, thereby forming a ultraviolet-curing resin layer 61 onto which the three-dimensional patterns were transferred. A thickness T2 of the ultraviolet-curing resin layer 61 remaining in recesses was 30 nm.

Note that although the glass substrate was coated with the ultraviolet-curing resin in this embodiment, it is also possible to coat the pattern surface of the transparent stamper with the ultraviolet-curing resin, or coat both the glass substrate and transparent stamper with the ultraviolet-curing resin.

The first resin stamper 71 herein used was tested by the testing apparatus described previously.

An experiment was conducted four times by using stampers A, B, C, and D.

Table 1 below shows the Vf/Vave value, the state of transfer to the ultraviolet-curing resin layer, and the bit error rate obtained by the experiments.

TABLE 1

| Stamper | Vf/Vave | Transfer state | Bit error rate |
| --- | --- | --- | --- |
| A | $7.62 \times 10^{-4}$ | ◯ | $10^{-6.3}$ |
| B | $5.10 \times 10^{-4}$ | ◎ | $10^{-7.1}$ |
| C | $2.41 \times 10^{-3}$ | X | Immeasurable |
| D | $7.89 \times 10^{-4}$ | X | $10^{-5.1}$ |

Note that the state of transfer to the ultraviolet-curing resin layer was evaluated as follows by observation with an optical microscope. A double circle indicates that no defect occurred by transfer peeling. ◯ indicates that one to three defects occurred by transfer peeling. X indicates that four or more defects occurred by transfer peeling.

Figure 5:
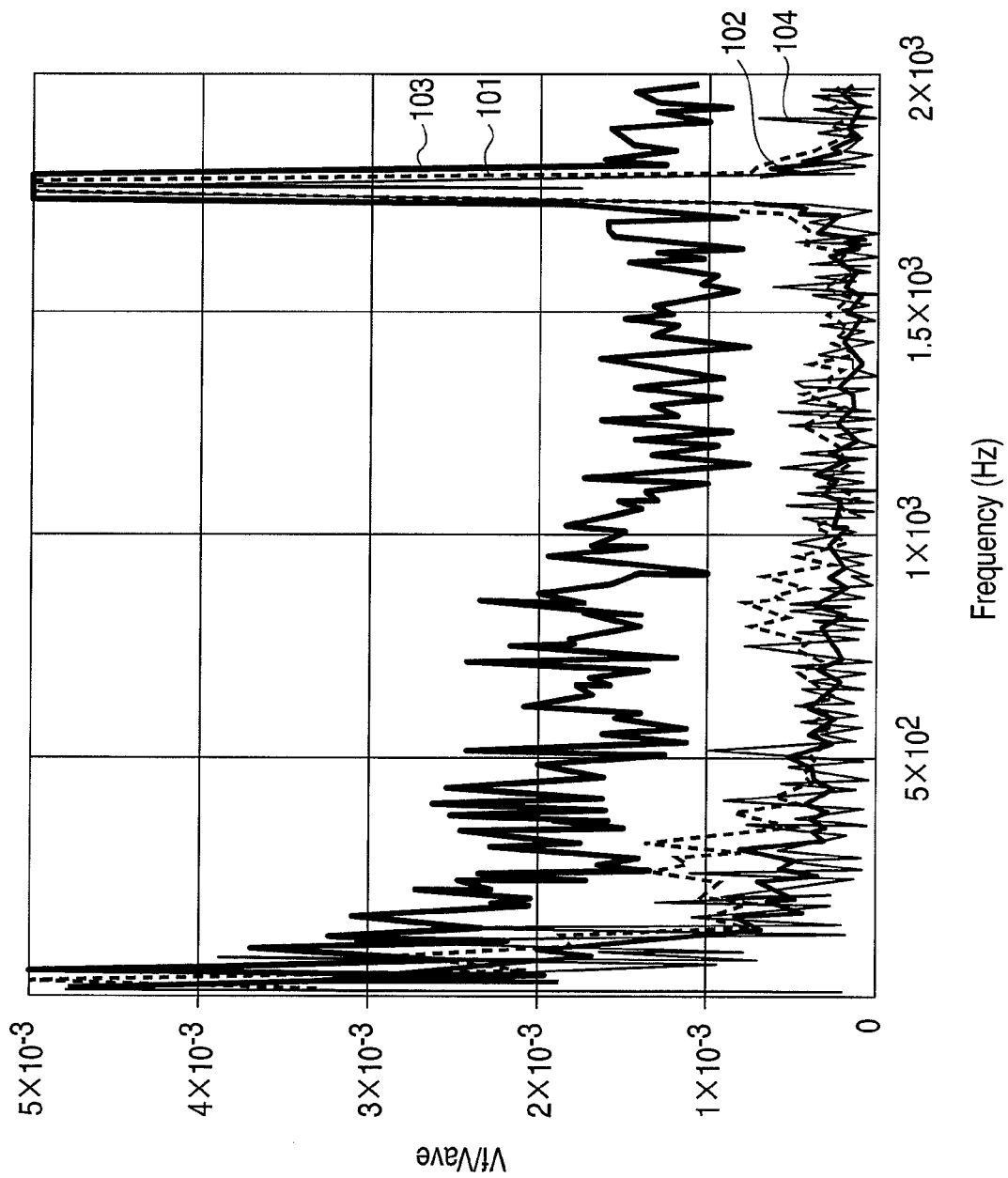
FIG. 5 is a graph showing the results of measurements performed by an FFT analyzer.

FIG. 5 shows the results of evaluation by the FFT analyzer herein used.

For stamper A, Vf=$1.01 \times 10^{-4}$ V, and Vave=0.1328 V, so Vf/Vave=$7.62 \times 10^{-4}$. Also, no problem was found when the transfer state of the magnetic recording medium after peeling was observed with an atomic force microscope (AFM).

For stamper B, Vf=$6.71 \times 10^{-5}$ V, and Vave=0.1315 V, so Vf/Vave=$5.10 \times 10^{-4}$. When the transfer state of the magnetic recording medium after peeling was observed with the AFM, the transfer state was sharper than that of stamper A.

For stamper C, Vf=3.06×10$^{-4}$ V, and Vave=0.1267 V, so Vf/Vave=2.41×10$^{-3}$. When the transfer state of the magnetic recording medium after peeling was observed with the AFM, the shape was disordered.

For stamper D, Vf=1.02×10$^{-4}$ V, and Vave=0.1288 V, so Vf/Vave=7.89×10$^{-4}$. When the transfer state of the magnetic recording medium after peeling was observed with the AFM, the shape was disordered.

Figure 4E:
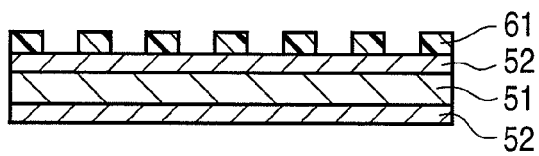
Figure 4F:
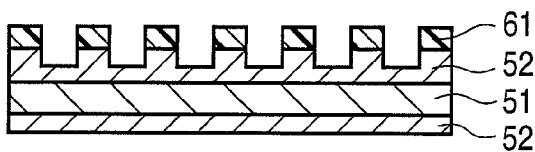
Figure 4G:
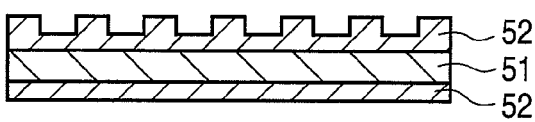

Next, as shown in FIG. 4E, the residue of the ultraviolet-curing resin 61 was removed by oxygen gas RIE (Reactive Ion Etching). Subsequently, as shown in FIG. 4F, an etching mask used to remove the residue produced in the imprinting step was used to process the magnetic material by etching (Ar ion milling) using an Ar ion beam. After the milling, the ultraviolet-curing resin was peeled. Etch back was then performed until a carbon protective film on the magnetic film was exposed. After the etch back, a C protective film (not shown) was formed. Thus, the magnetic recording medium was formed as shown in FIG. 4G.

FIG. 6 shows a magnetic recording apparatus for evaluating the RRO of the above-mentioned magnetic recording medium and performing recording and reproduction on the magnetic recording medium.

A magnetic recording apparatus 60 includes, in a housing 161, a magnetic recording medium 62, a spindle motor 63 for rotating the magnetic recording medium 62, a head slider 64 including a recording/reproduction head, a head suspension assembly (a suspension 65 and actuator arm 66) for supporting the head slider 64, a voice coil motor 67, and a circuit board.

The magnetic recording medium 62 is attached to and rotated by the spindle motor 63, and various digital data are recorded by the perpendicular magnetic recording method. The magnetic head incorporated into the head slider 64 is a so-called composite head, and includes a write head having a single-pole structure and a read head using, e.g., a GMR film or TMR film. The suspension 65 is held at one end of the actuator arm 66, and supports the head slider 64 so as to oppose it to the recording surface of the magnetic recording medium 62. The actuator arm 66 is attached to a pivot 68. The voice coil motor 67 is formed as an actuator at the other end of the actuator arm 64. The voice coil motor 67 drives the head suspension assembly to position the magnetic head in an arbitrary radial position of the magnetic recording medium 62. The circuit board includes a head IC, and generates a voice coil motor driving signal, and control signals for controlling read and write by the magnetic head. Information was recorded by using this magnetic disc apparatus, and the bit error rate was measured by reproducing the recorded signal.

For the magnetic recording medium transferred from stamper A and processed, the bit error rate (bER) was 10$^{-6.3}$, i.e., a good result was obtained. Note that in this embodiment, the bit error rate was defined as good when it was 10$^{-6}$ or less when measured in the track center.

For the magnetic recording medium transferred from stamper B and processed, the bit error rate (bER) was 10$^{-7.1}$, i.e., a good result was obtained.

For the magnetic recording medium transferred from stamper C and processed, it was impossible to float the head over the magnetic recording medium owing to uneven transfer, and check the recording/reproduction characteristics.

For the magnetic recording medium transferred from stamper D and processed, the bit error rate (bER) was 10$^{-5.1}$, i.e., a bad result was obtained.

The above experimental results reveal that when Vf/Vave<7.7×10$^{-4}$, transfer of the magnetic recording medium after peeling is good.

Stampers A and B having good transfer results were recycled to perform pattern transfer again in the same manner as for magnetic recording medium A, and the magnetic recording media were processed.

Information was similarly recorded on these magnetic recording media, and the bit error rates were measured by reproducing the recorded signals. Consequently, for magnetic recording medium E transferred from recycled stamper A and processed, the bit error rate (bER) was 10$^{-6.5}$, i.e., a good result was obtained.

For magnetic recording medium F transferred from recycled stamper B and processed, the bit error rate (bER) was 10$^{-6.7}$, i.e., a good result was obtained.

Also, the resin stamper after molding (before transfer) can be tested in the same manner as for the resin stamper after transfer.

For example, the Vf/Vave of a molded resin stamper formed following the same procedure as in the above embodiment was measured and found to be 8.24×10$^{-4}$ because Vf=1.08×10$^{-4}$ V and Vave=0.131 V.

A magnetic recording medium having patterns transferred by using the above stamper was similarly processed. Information was recorded on the completed magnetic recording medium and the bit error rate was measured by reproducing the recorded signal following the same procedures as above. As a consequence, the bit error rate was 10$^{-7.0}$, i.e., had a favorable value.

From the above results, a good resin stamper can be obtained after molding (before pattern transfer) by using the testing method of the present invention.

The quality of transfer to a magnetic recording medium can easily be checked by testing a stamper used in ultraviolet-curing resin transfer by using the optical testing apparatus. Also, when good results are obtained by the evaluation of the stamper, it is possible to omit testing of the magnetic recording medium after ultraviolet-curing resin transfer. Accordingly, risks causing defects can also be reduced. In addition, a stamper for which no defect was found by the test can be recycled. This makes it possible to economically use resources.

Note that the defect test using the resin stamper has been described in this embodiment, but the present invention is not limited to this. For example, the defect test can similarly be performed even when using a light-transmitting stamper obtained by forming patterns on, e.g., quartz or glass. Since quartz and glass are more expensive than the resin stamper, it is particularly important to test the light-transmitting stamper to check whether it is repetitively usable. Accordingly, the test using the present invention is very useful.

Furthermore, in this embodiment, the present invention is used for the resin stamper having both track patterns and address patterns. However, the present invention is also applicable to a light-transmitting stamper having patterns of only the address portion.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of evaluating a stamper, which has a three-dimensional pattern, for defects, wherein the method comprises:

transferring the three-dimensional pattern of the stamper to an ultraviolet curing resin layer of a recording medium by pressing the three-dimensional pattern against the ultraviolet curing resin layer, wherein the recording medium comprises a recording layer and the ultraviolet curing resin layer on a surface of the recording layer;

using the ultraviolet curing resin layer with the transferred three-dimensional pattern as a mask to form a track pattern in the surface of the recording layer, wherein the three-dimensional pattern corresponds to a data area comprising a data recording portion and an address portion of the recording medium;

rotating the stamper and determining whether the maximum voltage (Vf) measured by an FFT analyzer within the range of frequencies 60 to 170 times the rotation speed of the stamper and the average of the sum signal voltage (Vave) of the sum signal based on reflected light from the data recording portion of the stamper satisfy the expression:

$$Vf/Vave < 7.7 \times 10^{-4}$$

when the data recording portion of the stamper is irradiated with a laser comprising a wavelength of equal to or shorter than 450 nm and a laser numerical aperture, NA, of equal to or larger than 0.6;

wherein when the expression is satisfied, there are no defects in the stamper and the stamper is recycled, and when the expression is not satisfied, there is a defect in the stamper and the stamper is no longer used.

2. The method of claim 1, further comprising:

determining whether the Vf and Vave satisfy the expression:

$$Vf/Vave < 7.7 \times 10^{-4}$$

before and after the pattern corresponding to the track pattern is transferred onto the ultraviolet-curing resin layer.

3. The method of claim 2, further comprising:

recycling the stamper when the relationship between the Vf and the Vave before the pattern corresponding to the track pattern is transferred satisfy the expression:

$$Vf/Vave < 7.7 \times 10^{-4}$$

and the relationship is the same after the pattern corresponding to the track pattern is transferred.

* * * * *